(12) United States Patent
Woodard et al.

(10) Patent No.: US 9,003,612 B2
(45) Date of Patent: Apr. 14, 2015

(54) COUPLER, METHODS, AND APPLICATIONS

(75) Inventors: Reagan Woodard, Sugar Land, TX (US); Matthew Basnight, Richmond, TX (US); Etienne Marc, Houston, TX (US); James N. Thompson, Sugar Land, TX (US); William Hopewell, Richmond, TX (US)

(73) Assignee: Fairfield Industries Incorporated, Sugar Land, TX (US)

( * ) Notice: Subject to any disclaimer, the term of this patent is extended or adjusted under 35 U.S.C. 154(b) by 276 days.

(21) Appl. No.: 13/442,045

(22) Filed: Apr. 9, 2012

(65) Prior Publication Data
US 2013/0263410 A1    Oct. 10, 2013

(51) Int. Cl.
*F16G 11/00* (2006.01)
*F16G 15/04* (2006.01)
*F16G 11/14* (2006.01)

(52) U.S. Cl.
CPC .............. *F16G 11/143* (2013.01); *F16G 15/04* (2013.01); *Y10T 24/39* (2013.01)

(58) Field of Classification Search
USPC .......... 24/69 AT, 70 T, 71 A, 115 R, 265 AL, 24/265 R, 582.11, 598.2, 598.8; 403/225, 403/298, 300; 367/15, 20
See application file for complete search history.

(56) References Cited

U.S. PATENT DOCUMENTS

| | | | | | |
|---|---|---|---|---|---|
| 975,323 | A | * | 11/1910 | Brown | 24/598.1 |
| 3,061,999 | A | * | 11/1962 | O'Brien | 59/90 |
| 3,280,438 | A | * | 10/1966 | Luketa | 24/582.11 |
| 3,595,292 | A | * | 7/1971 | Muller | 152/243 |
| 3,962,755 | A | * | 6/1976 | Buschini et al. | 24/684 |
| 4,102,378 | A | * | 7/1978 | Weidler | 152/243 |
| D277,338 | S | * | 1/1985 | Cuttler | D3/207 |
| 4,516,418 | A | * | 5/1985 | Cuttler | 70/456 R |
| 5,851,040 | A | * | 12/1998 | Fredriksson | 294/82.11 |
| 7,310,287 | B2 | | 12/2007 | Ray et al. | |
| 7,933,165 | B2 | | 4/2011 | Thompson et al. | |

* cited by examiner

*Primary Examiner* — Robert J Sandy
*Assistant Examiner* — David Upchurch
(74) *Attorney, Agent, or Firm* — William Greener; Bond, Schoeneck & King, PLLC

(57) ABSTRACT

A coupler including an at least partially cylindrically shaped external body portion having a longitudinal axis, which further includes an integral first and second, axially opposed ends that have a taper along the longitudinal axis. The coupler includes an integral gate consisting of two axially opposed, disconnected tongue sections having an open space there between. The at least partially cylindrically shaped external body portion has an open space at least partially enclosed by an inner surface of the body portion and disposed over at least a portion of the at least partially cylindrically shaped external body portion. The external body portion is characterized by a maximum radial dimension, including a circumferential region of the at least partially cylindrically shaped external body portion intermediate the first and second axially opposed ends where the gate is disposed.

11 Claims, 10 Drawing Sheets

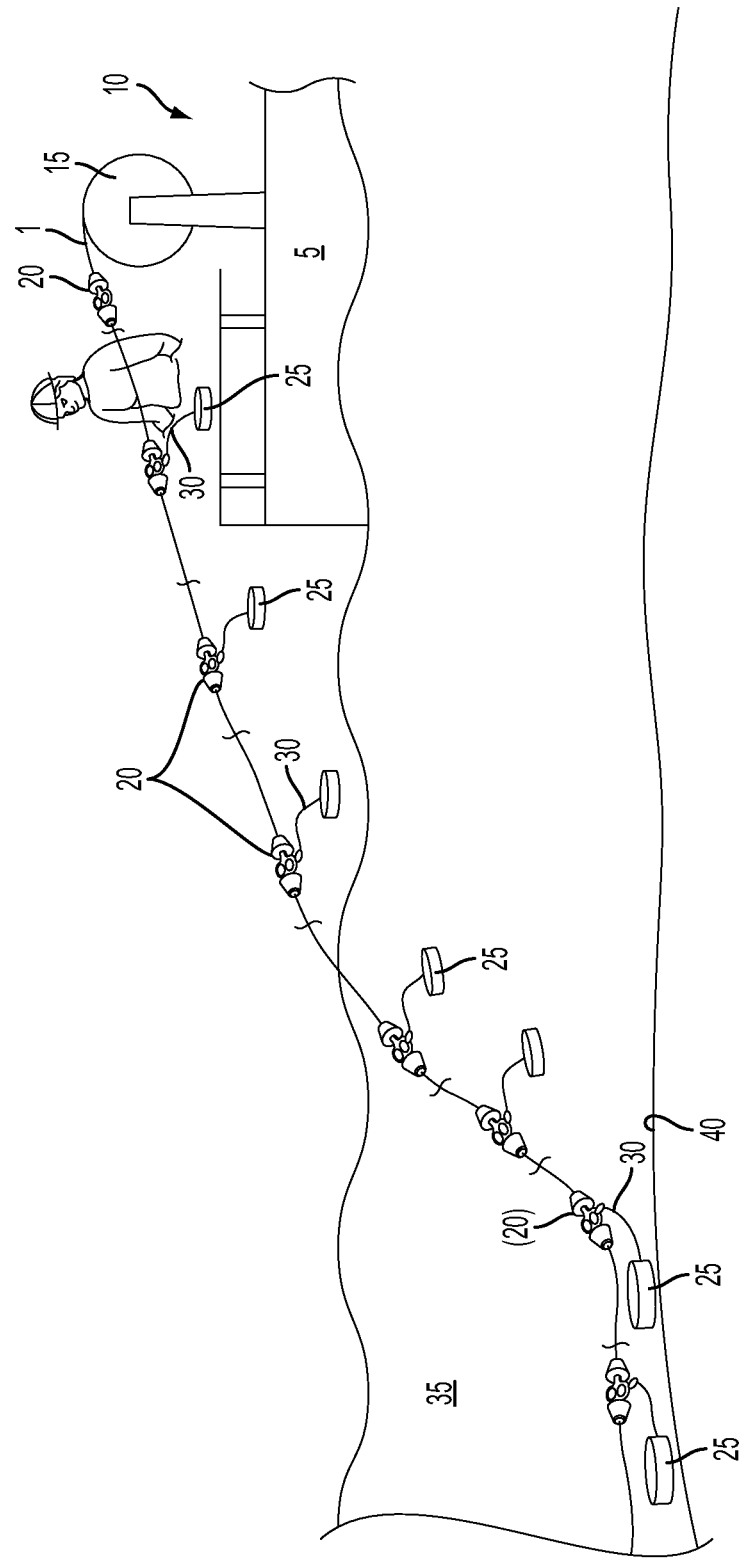

COUPLER, METHODS, AND APPLICATIONS

RELATED APPLICATION DATA

The instant application is related to US application Ser. No. 13/442,064 entitled COUPLING RING, METHODS, and APPLICATIONS and to US application Ser. No. 13/442,074 entitled COUPLER/COUPLING RING ASSEMBLY, METHODS, and APPLICATIONS, all filed on Apr. 9, 2012.

GOVERNMENT SPONSORSHIP

N/A.

TECHNICAL FIELD

Embodiments of the present invention relate generally to the field of seismic exploration. More particularly, embodiments described herein relate to a coupler, a coupling ring, a coupler/coupling ring assembly, and applications of same, for connecting lengths of rope or cable and attaching seismic data recording nodes to said lengths of rope or cable.

BACKGROUND

Seismic exploration operations generally utilize a seismic energy source to generate an acoustic signal that propagates into the earth. The acoustic signal is partially reflected by subsurface seismic reflectors in the earth, which may include interfaces between subsurface lithologic or fluid layers that may be characterized by different elastic properties. The reflected signals are detected and recorded by seismic receiver units (hereinafter, 'nodes') located at or near the surface of the earth, thereby generating a seismic survey of the subsurface environment. The recorded signals, or seismic energy data, can then be processed to yield information relating to the lithologic subsurface formations, identifying such features as, for example, lithologic subsurface formation boundaries.

Generally, the method for detection and recording of seismic signals is similar on land and in marine environments; however, marine environments present unique challenges presented by the body of water overlying the earth's surface. Seismic exploration operations in marine environments are typically conducted from the deck of one or more seismic exploration vessels, such as floating platforms or ships. The seismic exploration vessels typically provide storage and transportation for a plurality of nodes and associated operational equipment. Seismic exploration in deep water typically involves the deployment of nodes from the deck of the seismic exploration vessel and their placement on or near the bottom of a body of water.

As shown and described in U.S. Pat. No. 7,933,165 (the '165 patent), the subject matter of which is incorporated herein by reference in its entirety, FIG. 1A is a schematic side view of a deployment operation from a vessel 5 using a (load-bearing, non-signal-transmitting) cable 1. In the deployment operation, the cable 1 is paid out over a backdeck 10 of the vessel 5 from a spool, sheave or pulley, powered or otherwise, such as a cable handling device 15. The cable 1 includes a plurality of connectors 20 that must pass through at least a portion of the cable handler 15. A seismic sensor unit ('node') 25 is coupled to each of the respective connectors 20 as the cable passes over the backdeck 10 by personnel onboard the vessel. In the deployment operation, the nodes 25 are coupled to the connectors 20 by a lanyard 30, which may be a length of flexible rope, cable, or chain. The cable with nodes 25 coupled thereto form a mainline cable that falls to rest on or near a bottom 40 of a body of water 35 to form at least a portion of a seismic array. The mainline cable may be many miles long and have over 200 nodes attached. After one or more mainline cables are positioned on the bottom 40 to assist in lowering the nodes to the bottom 40, the seismic survey is performed.

Referring again to the '165 patent, FIG. 1B is a perspective view of a portion of the (load-bearing, non-signal-transmitting) cable 1 prior to coupling with nodes 25 of FIG. 1A. Each of the connectors 20 typically include a body 45 that is larger than the diameter of the cable, and is configured to clamp or fasten to an outer surface of the cable. The connectors 20 include ring-like or hook-like members 50 to facilitate connection and disconnection of the nodes. The cable also includes a plurality of discrete cable coupling devices 55 configured to connect ends of cable sections to increase the overall length of the cable. After the seismic survey, the cable and nodes are retrieved. During retrieval, the cable is spooled or routed through a winch, reel or sheave, a pinch roller powered or otherwise, for example, the cable handler 15 of FIG. 1A, which pulls the cable and nodes from the water. As the cable passes over the deck of the vessel, the nodes are detached from the cable and the cable and nodes are stowed.

As the cable 1 shown in FIGS. 1A and 1B may be routed through a cable handler during deployment and/or retrieval, the connectors 20 and/or cable coupling devices 55 pose a risk of snagging, binding, or tangling the cable. In some cases, the ring-like or hook-like members 50 protrude from the periphery of the body 45, which may snag, bind, or tangle the cable. Further, the ring-like or hook-like members 50 create the risk of injury to personnel that may be in the vicinity of the cable, such as during node coupling and decoupling. Still further, in rough seas or merely during the node deployment and/or recapture operations, the lanyard may become pinched at the point of connection to the connector, resulting in entanglement or disconnection and loss of one or more nodes.

FIG. 1C (FIG. 7A of the '165 patent) is a perspective view of a cable connector 715, which includes a rotatable clamp 700 disposed on a central coupling section 225. The rotatable clamp 700 includes a swivel portion 705 and an attachment ring 710 coupled by a neck 725. The swivel portion 705 is configured to be positioned within a circumferential groove in the connector and is rotatable relative to the groove and/or the connector 715. The attachment ring 710 is configured as an attachment point for a node or a node tether and/or a clamp device as described in the '165 patent. As shown, the attachment ring 710 is shaped as a D-ring and includes a gap 720 to define a split ring. The outer dimension of the swivel portion 705 is substantially circular and defines a diameter that is equal to or slightly smaller than an outer diameter of the central coupling section 225 of the connector.

The inventors have recognized the advantages and benefits of a practical and robust solution directed to solving the problems and addressing the shortcomings in the art described above and others known in the art.

SUMMARY

An embodiment of the invention is directed to a coupler. A non-limiting, exemplary embodiment of the invention is a coupler for a load-bearing cable, particularly in, but not limited to, undersea applications. The coupler includes a body portion having integral first and second ends and an integral gate having a key entry region, wherein the body portion has a free space at least partially enclosed by an inner surface of the body portion and the gate. In various non-limiting aspects the coupler further includes the following features and/or characteristics:

the key entry region is a solid, integral portion of the gate;
the key entry region has a thickness that is less than the thickness of any other portion of the gate;
the key entry region thickness is greater than 0.015 in.;
the key entry region is flat;
the key entry region consists of a spaced opening between opposing, disconnected distal ends of the gate;
at least one of the distal ends is tapered to form a distal edge;
the distal edge has a length, L, along an axis and a width, W, along a different axis;
the distal edge has a length, L, along an x-axis and a width, W, along a y-axis that is perpendicular to the x-axis, further wherein the coupler has a longitudinal axis along a z-axis that is perpendicular to the x- and y-axes;
at least one of the opposing, disconnected distal ends of the gate includes an integral lip;
the opposing, disconnected distal ends of the gate are separated by a distance d, where d≥0.015 in.;
d is a constant value;
the opposing, disconnected distal ends of the gate are symmetrical;
the first and second ends are threaded and the connecting ends of the first and second end connectors are threaded;
the inner surface of the body portion is angled;
the inner surface of the body portion has an apex intermediate its ends;
the inner surface of the body portion is curved;
the inner surface of the body portion is flat;
the gate further comprises two opposing, disconnected tongue sections having respective distal ends;
at least one of the distal ends is tapered to form a distal edge;
the distal edge has a length, L, along an x-axis and a width, W, along a y-axis that is perpendicular to the x-axis, further wherein the coupler has a longitudinal axis along a z-axis that is perpendicular to the x- and y-axes;
at least one of the tongue sections has a lip;
the distal ends of the two opposing tongue sections are separated by a distance d, where d≥0.015 in.;
d is a constant value;
the two opposing tongue sections are symmetrical.

In a related embodiment, the coupler includes a body portion having first and second ends, and two opposing, symmetrical tongue sections having respective, opposing distal ends disposed between the first and second ends, further wherein the body portion has an open free space defined by an inner surface of the body portion and the two opposing tongue sections, further wherein at least one of the distal ends is tapered to form a distal edge, further wherein the distal ends of the two opposing tongue sections are separated by a distance d, where d≥0.015 in., which defines an opening into the free space of the coupler body, further wherein the distal edge has a length, L, along an axis and a width, W, along a different axis. In various non-limiting aspects the coupler further includes the following features and/or characteristics:

further wherein the distal edge has a length, L, along an x-axis and a width, W, along a y-axis that is perpendicular to the x-axis, further wherein the coupler has a longitudinal axis along a z-axis that is perpendicular to the x- and y-axes.

the free end of at least one of the tongue sections has a lip that protrudes inwardly;
the first end is threaded;
the inner surface of the body portion is angled;
the inner surface of the body portion has an apex disposed intermediate its ends;
the inner surface of the body portion is curved;
the inner surface of the body portion is flat;
d is a constant value.

An embodiment of the invention is directed to a coupling ring. A non-limiting, exemplary embodiment of the invention is a coupling ring that includes an integral perimetal body having a head section, a foot section, and two arm sections therebetween, wherein at least one of the arm sections has a key region, further wherein the key region consists of a solid, integral portion of the at least one arm section. In various non-limiting aspects the coupling ring further includes the following features and/or characteristics:

the key region has a thickness that is less than the thickness of any other portion of the arm;
the key region has a thickness that is greater than 0.015 in.;
the key region is flat;
the key region is disposed closer to the foot section than to the head section;
the head section has an interior curvature, C, and the foot section has an opposing interior curvature, c, where c>C;
the coupling ring further includes a crossbar integrally connecting the two arm sections, disposed between the key region and the foot section;
the coupling ring further includes at least one nub that protrudes inwardly from an inner surface of the perimetal body, disposed between the key region and the foot section;
the key region has two opposing walls in the shape of a V;
the key region has two opposing, inclined walls and a flat surface intermediate a base end of the walls, in the shape of a $\sqrt{\phantom{x}}$;
the key region has two opposing, inclined top walls and two opposing, inclined bottom walls, and a flat region having a rectangular cross sectional shape between the top and bottom walls, in the shape of a $\genfrac{}{}{0pt}{}{\vee}{\wedge}$;
the key region is a pinched region of the arm having an arbitrary shape of reduced dimension.

An embodiment of the invention is directed to a coupler/coupling ring assembly. In an exemplary embodiment, the coupler/coupling ring assembly is particularly suited for interconnecting lengths of load-bearing cable; more particularly, but not limited to, in undersea applications, and attaching a seismic data recording device to the coupler via the coupling ring. In a non-limiting, exemplary embodiment of the invention the coupler/coupling ring assembly comprises a coupler including a body portion having integral first and second ends and an integral gate having a key entry region consisting of a spaced opening between opposing, disconnected distal ends of the gate, wherein the body portion has a free space at least partially enclosed by an inner surface of the body portion and the gate; and a coupling ring that is removeably engageable with the coupler, the coupling ring including an integral perimetal body having a head section, a foot section, and two arm sections therebetween, wherein at least one of the arm sections has a key region that is complimentary to the gate, further wherein the key region consists of a solid, integral portion of the at least one arm section. In various non-limiting aspects the coupling ring further includes the following features and/or characteristics:

at least one of the distal ends of the gate is tapered to form a distal edge;
the distal edge has a length, L, along an axis and a width, W, along a different axis;
further wherein the distal edge has a length, L, along an x-axis and a width, W, along a y-axis that is perpendicular to the x-axis, further wherein the coupler has a longitudinal axis along a z-axis that is perpendicular to the x- and y-axes.
at least one of the opposing, disconnected distal ends of the gate includes an integral lip;
the opposing, disconnected distal ends of the gate are separated by a distance d, where d≥0.015 in.;
d is a constant value;
the opposing, disconnected distal ends of the gate are symmetrical;
the gate further comprises two opposing, disconnected tongue sections having respective distal ends;
the distal end of at least one of the tongue sections is tapered to form a distal edge having a length, L, along an axis and a width, W, along a different axis;
further wherein the distal edge has a length, L, along an x-axis and a width, W, along a y-axis that is perpendicular to the x-axis, further wherein the coupler has a longitudinal axis along a z-axis that is perpendicular to the x- and y-axes.
the coupling ring has a maximum separation distance between the two arms that is substantially equal to or greater than a maximum cross sectional y-axis dimension of the body portion of the coupler;
the key region of the coupling ring has a thickness that is less than the thickness of any other portion of the arm;
the key region of the coupling ring has a thickness that is greater than 0.015 in.;
the key region of the coupling ring is flat;
the key region of the coupling ring is disposed closer to the foot section than to the head section;
the head section has an interior curvature, C, and the foot section has an opposing interior curvature, c, where c>C;
the coupling ring further comprises a crossbar integrally connecting the two arm sections, disposed between the key region and the foot section;
further comprising at least one nub that protrudes inwardly from an inner surface of the perimetal body of the coupling ring, disposed between the key region and the foot section.

Additional features and advantages of the invention will be set forth in the detailed description to follow, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

The present invention will be more fully understood and appreciated by reading the following Detailed Description in conjunction with the accompanying drawings, in which:

FIG. 1A is a schematic side view of a deployment operation of a seismic cable from a marine vessel, as known in the art;

DETAILED DESCRIPTION OF NON-LIMITING, EXEMPLARY EMBODIMENTS OF THE INVENTION

Figure 1B:
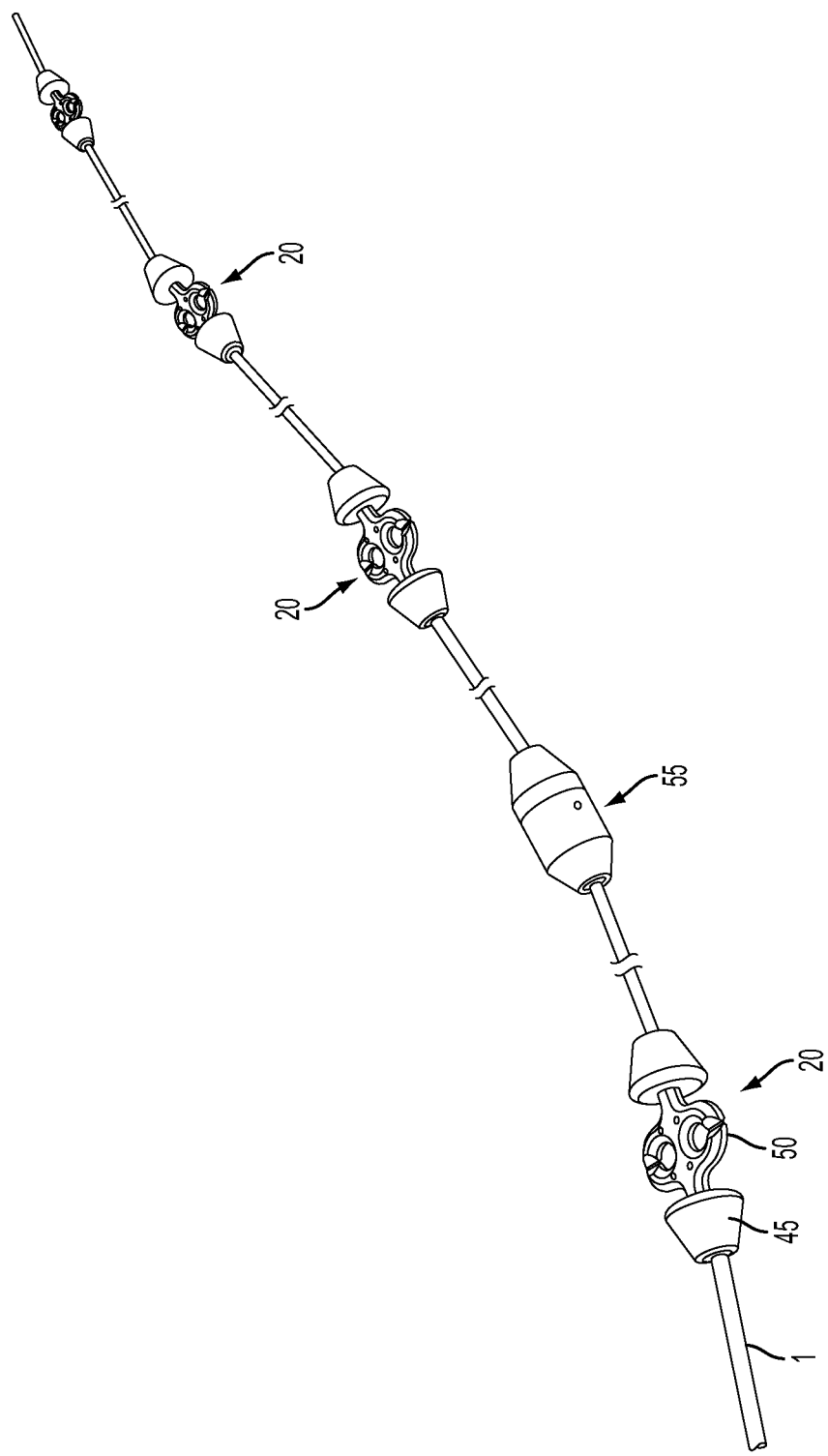
FIG. 1B is a perspective view of a portion of a seismic cable, as known in the art.
Figure 1C:
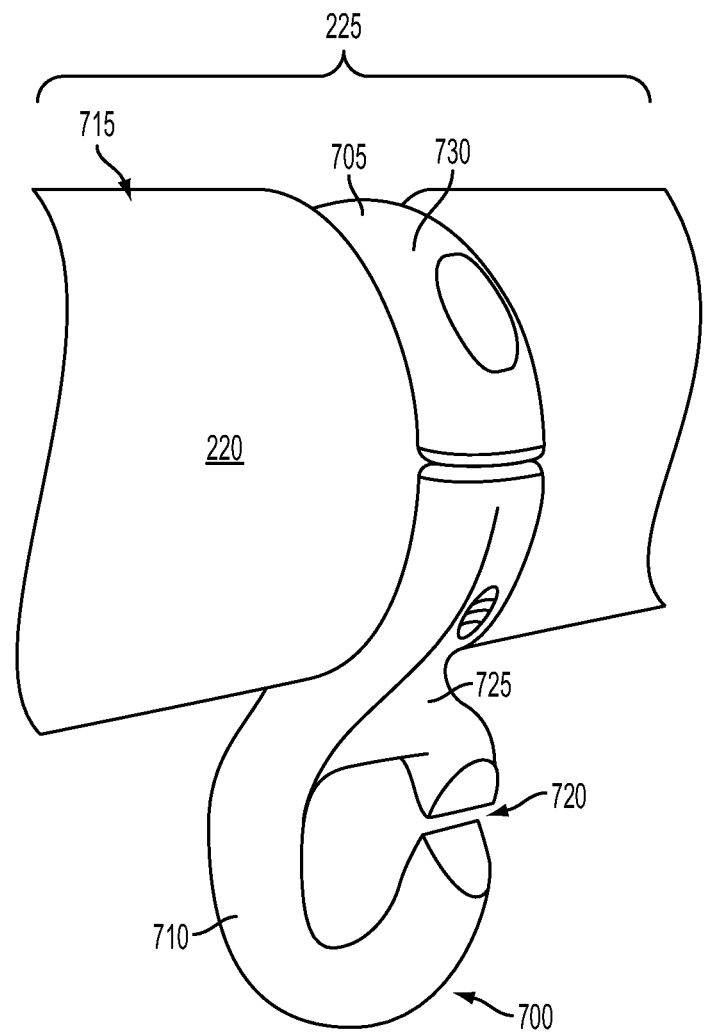
FIG. 1C is a perspective view of a portion of a cable connector that includes a rotatable clamp, as known in the art.
Figure 2:
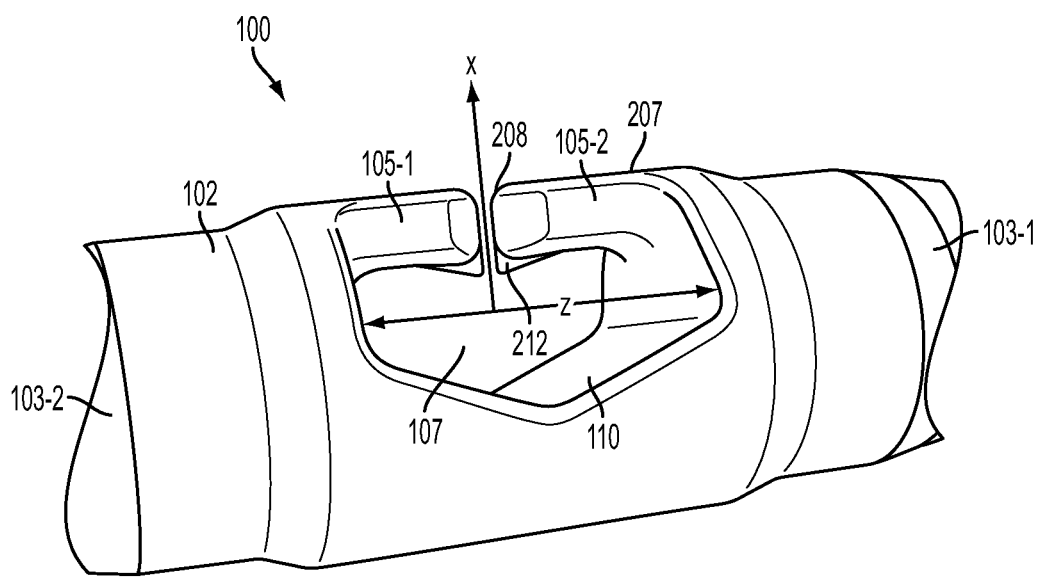
FIG. 2 is a photograph of a coupler according to a non-limiting exemplary embodiment of the invention.

An exemplary embodiment of a cable coupler 100 that is particularly suited for interconnecting lengths of load-bearing cable (e.g., rope, plastic cable, braided cable, etc.) is illustrated in FIG. 2. The coupler 100 includes a body portion 102 having first and second ends 103-1, 103-2. The coupler body also comprises an integral gate 207 having a key entry region 208. The coupler body also has an open free space 107 that is at least partially enclosed by an inner surface 110 of the body portion and the gate 207 (also see FIG. 8).

Figure 3:
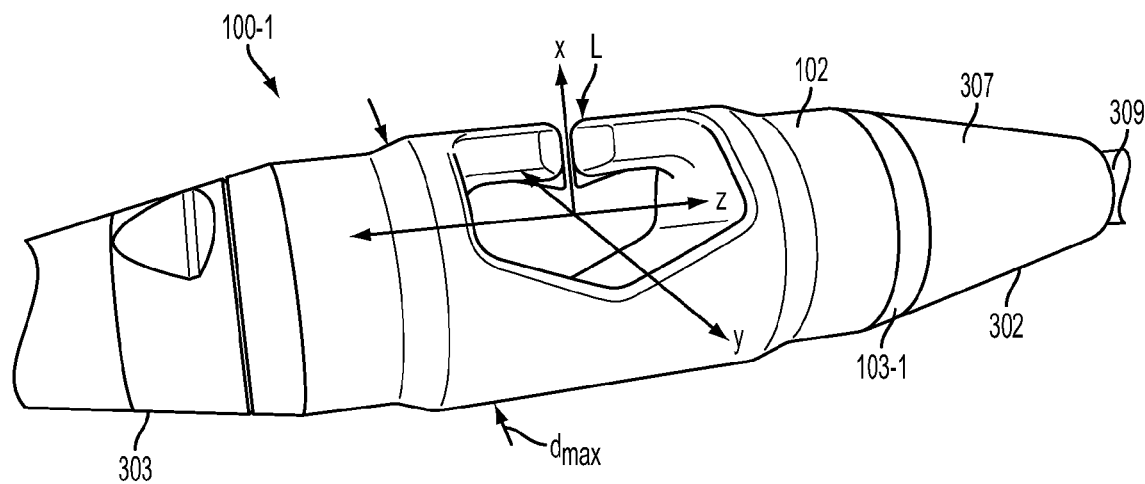
FIG. 3 is a photograph of a coupler according to a non-limiting exemplary aspect of the invention.

As illustrated in FIG. 2, the open free space is substantially enclosed by two opposing tongue sections 105-1, 105-2, which form the gate. The two opposing, integral tongue sections 105-1, 105-2 have respective, opposing distal (free) ends 106-1, 106-2 (see FIG. 8) that are disposed between the first and second ends of the body portion. As illustrated, the tongue sections are symmetric in size and shape, but need not be. In the exemplary aspect, the distal end (106-1, 106-2) of each tongue section is tapered to form an edge of length L oriented along an x-axis as shown in FIGS. 2, 3. The edge has a width W oriented along a y-axis as shown. Further, the coupler has a longitudinal axis along a z-axis of the coordinate system. The x-y-z axes form a Cartesian coordinate system. In a non-limiting, exemplary aspect, the distal ends of the tongue sections are separated by a distance d, forming the key entry region of the gate. In an aspect, d is as small as is practically possible; more particularly, d≥0.015 in.; more particularly, d≤0.5 in., however, d may be greater than 0.125 in. The exemplary range 0.015≤d≤0.125 in. represents a practical operational distance in undersea seismic node applications. The separation distance d is constant, as illustrated, but may alternatively vary over the length L. Again, as will be more clearly described below in relation to the coupler/coupling ring assembly, the size, shape, orientation, and separation of the tongue sections, or other geometries of the gate and key entry region, are designed to optimally facilitate the intentional engagement/disengagement of the coupling ring (described below) with the coupler while minimizing the opportunity for unintentional disengagement of the coupling ring from the coupler while in-use. To this end, the distal end of at least one of the tongue sections has a lip 212 (FIG. 2) that protrudes inwardly towards the free space 107. As illustrated, the lip has an inclined surface, which again is designed to minimizing the opportunity for unintentional disengagement of the coupling ring from the coupler while in-use. The skilled person will appreciate that other shapes of the lip(s) (e.g., "j," "L," "hook," "ball," others) may be used, which all will function to deflect the complimentary key region of the coupling ring (described below) from disengageable alignment with the key entry region of the gate of the coupler.

As further illustrated in FIGS. 2 and 3, the inner surface 110 of the coupler body 102 is angled. Although it may be angled in a single or multiple directions, it is shown in the figure as a symmetrical roof (or valley) having an apex that is aligned opposite to the key entry space separating the opposing distal ends of the tongue sections 105-1, 105-2. Alternatively, the inner surface 110 could be curved or flat. As will be more clearly described below in relation to the coupler/coupling ring assembly, the size and shape of the open space 107 is designed to facilitate limited free movement of the engaged coupling ring within the space in an in-use environment while minimizing the opportunity for unintentional disengagement of the coupling ring from the coupler, while at the same time optimizing the ease of intentional disengagement of the coupling ring from the coupler.

FIG. 3 shows an exemplary aspect 100-1 of the coupler 100 including a tapered first end connector 302 that can be (and is, as shown) removeably coupled at a connecting end 307 of the first end connector 302 to the first end 103-1 of the coupler. In the illustrated exemplary aspect, the first end 103-1 of the coupler and the connecting end 307 of the first end connector 302 are threaded to enable a secure connection. Other mechanisms known in the art to make a secure connection, such as but not limited to, a tongue/groove, a snap fit, a key/lock, and others may be used. The first end connector 302 has an opposing, open end 309 (see also FIG. 7) that is adapted to receive and securely hold a terminal end of a cable 1 (see FIG. 7), as known in the art.

If the coupler 100 is a terminal coupler (as shown, e.g., in FIG. 7), then the second end 103-2 of the coupler body may simply terminate with an arbitrarily shaped end, a capped end, a tapered end, threaded end, or otherwise. Alternatively, if the coupler 100 is an intermediate coupler for interconnecting two lengths of cable, then the second end 103-2 of the coupler body will be similar to the first end, comprising a tapered second end connector 303 that likely is identical to the first end connector 302, which can be removeably coupled at a connecting end thereof to the second end 103-2 of the coupler body. Alternatively, the first and second ends may be counter-threaded.

Figure 6:
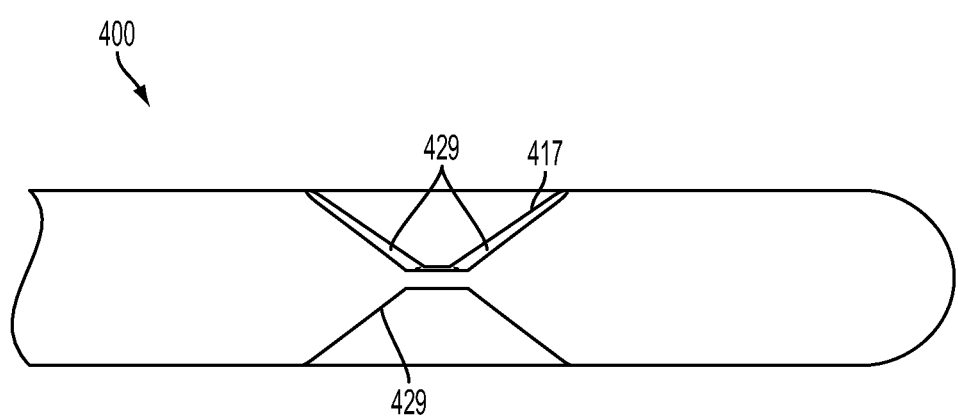
FIG. 6 is a photograph of the key region of a coupling ring according to a non-limiting, exemplary aspect of the invention.

According to an alternative aspect, the key entry region of the coupler body may be a solid, integral portion of the gate. In this aspect, it may look identical or similar to the key region 417 of the coupling ring as shown in FIG. 6. In this aspect, the key entry region has a thickness that is less than the thickness of any other portion of the gate. Further, as a complimentary portal to the key region of the coupling ring, the key entry region may have a thickness greater than 0.015 in., advantageously between 0.015 in. and 0.125 in., or greater than 0.125 in. The key entry region may be flat as shown, or of another complimentary shape (and size, orientation, etc.) to the key region of the coupling ring. In this aspect, the key region of the coupling ring will comprise opposing, disconnected ends to allow engagement/disengagement of the coupling ring with the coupler body.

Figure 4:
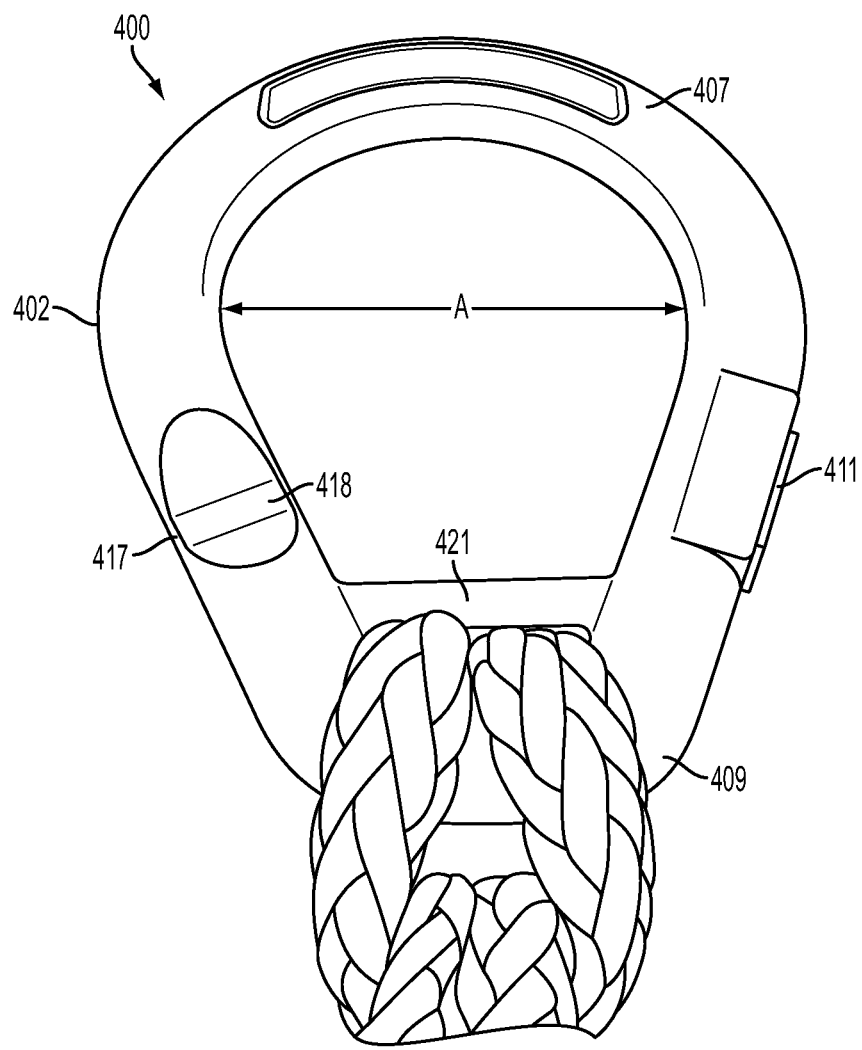
FIG. 4 is a photograph of a coupling ring according to a non-limiting exemplary embodiment of the invention.
Figure 7:
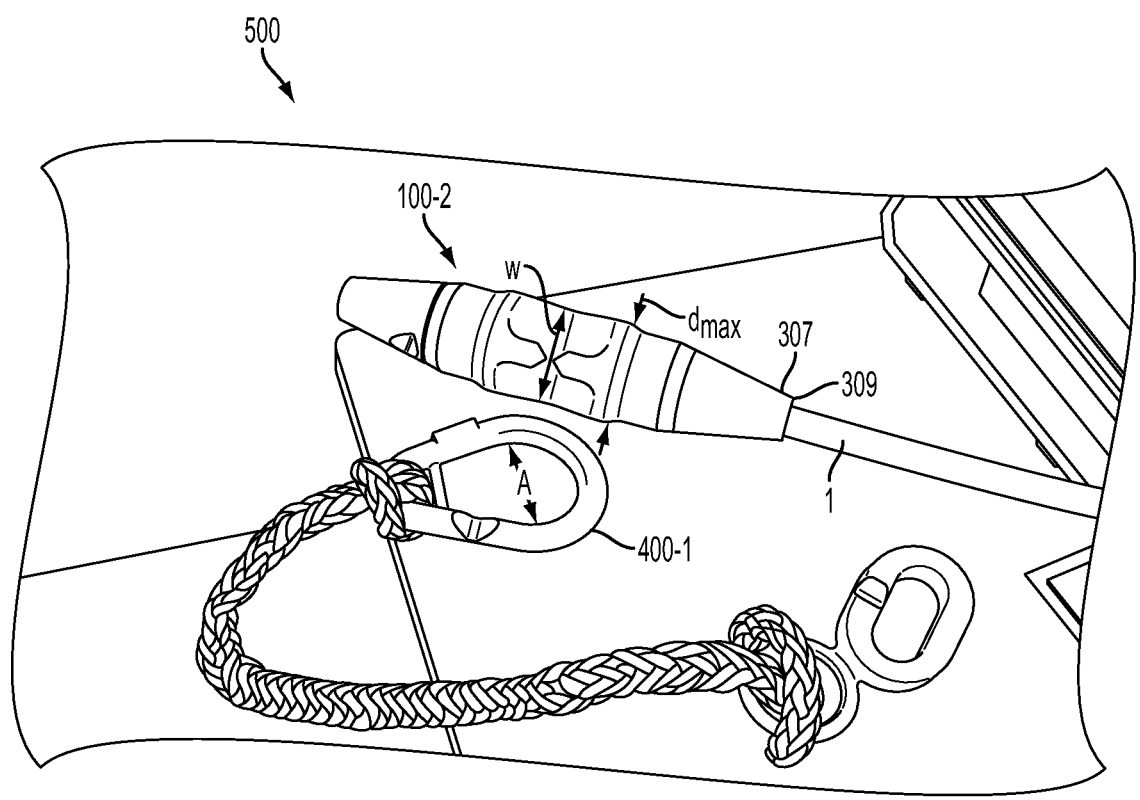
FIG. 7 is a photograph of a coupler and a coupling ring of a coupler/coupling ring assembly in an unassembled state, according to a non-limiting exemplary embodiment of the invention. The rope lanyard and D-link are not part of the invention per se.

A complimentary embodiment of the invention is a coupling ring 400 as illustrated in FIG. 4 (see also FIG. 7). The coupling ring 400 has an integral perimetal body 402 having a head section 407, a foot section 409, and two arm sections 411 therebetween. The body 402 has a curvilinear cross sectional shape typical of a forged metal link such as, e.g., a D-link or a pear-link. At least one of the arm sections 111 has a key region 417 that consists of a solid, integral portion of the at least one arm section. As shown in FIG. 6, when viewed from the side, the key region of the coupling ring body has a minimal thickness, T, where advantageously, $0.015$ in.$\leq T \leq 0.125$ in. and is complimentary to the key entry region distance of the coupler, d, described above. Advantageously, the key region 417 as shown in FIGS. 4, 4-A has at least one flat surface region 418. The key region 417 is further shown having symmetric, inclined opposing side walls 429 that form a "\/ /\" shape. Alternatively, if no flat surface region 418 is present, the key region may be in the shape of a "V"; or the shape of a "\_/" in the presence of the flat surface region 418 only on one side of the coupling ring body. The size, shape, and orientation of the key region may advantageously have a different shape as long as it is complimentary to the key entry region of the gate of the coupler. The size, shape, thickness, and orientation of the key region (particularly with opposing flat surface regions) is designed to optimize the ease of intentional engagement/disengagement of the coupling ring with the coupler and minimize the unintentional disengagement of the coupling ring from the coupler while in-use. Advantageously, the at least one key region in the at least one arm of the coupling ring body is disposed closer to the foot section than to the head section. This placement facilitates, among other advantages, ease of intentional engagement/disengagement of the coupling ring with the coupler and minimizes the unintentional disengagement of the coupling ring from the coupler while in-use.

The geometric functional optimization of the coupling ring and the coupler/coupling ring assembly benefit from the advantageous exemplary 'pear-link' shape of the coupler ring (FIG. 4). In this aspect, the head section has an interior curvature, C, and the foot section has an opposing interior curvature, c, where c>C.

Figure 5:
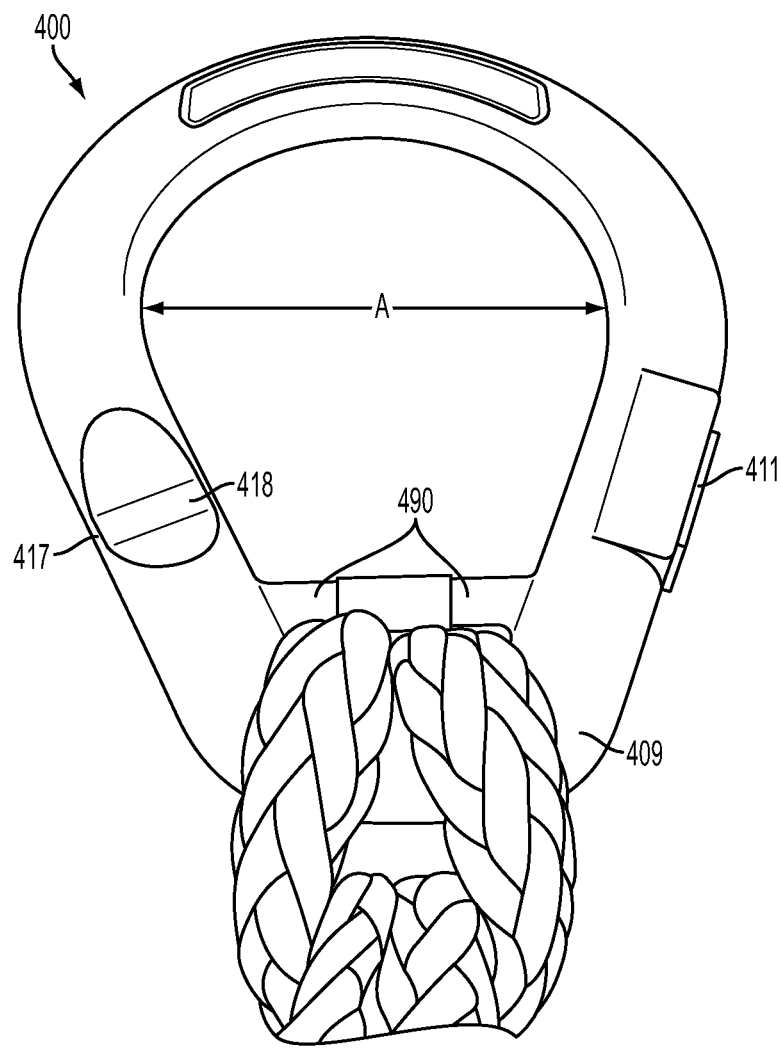
FIG. 5 is a photograph of a coupling ring according to a non-limiting exemplary embodiment of the invention.

The coupling ring 400 in FIG. 4 further includes a crossbar 421 that integrally connects with the two arm sections, and which is disposed between the key region and the foot section. While the crossbar may add strength to the coupling ring, it advantageously creates a barrier against movement of the looped end of the rope or cable of the lanyard away from the foot section of the coupling ring body under in-use conditions. Maintaining the looped end of the rope or cable of the lanyard about the foot section of the coupling ring body aids in stabilizing the position and movement of the coupling ring in the coupler while in-use, thus further minimizing the unintentional disengagement of the coupling ring from the coupler while in-use, and avoiding pinching or other unwanted effects on the lanyard rope or cable. To this end, the coupling ring may alternatively include, in place of the crossbar, at least one nub 490 that protrudes inwardly from an inner surface of the perimetal body and disposed between the key region and the foot section, as illustrated in FIG. 5. The at least one nub would function similarly to the crossbar in creating a barrier against movement of the looped end of the rope or cable of the lanyard away from the foot section of the coupling ring body. As would be appreciated by a person skilled in the art, the at least one nub may have a variable length, angular orientation, body and/or end shape, etc. to best provide its barrier functionality.

Figure 8:
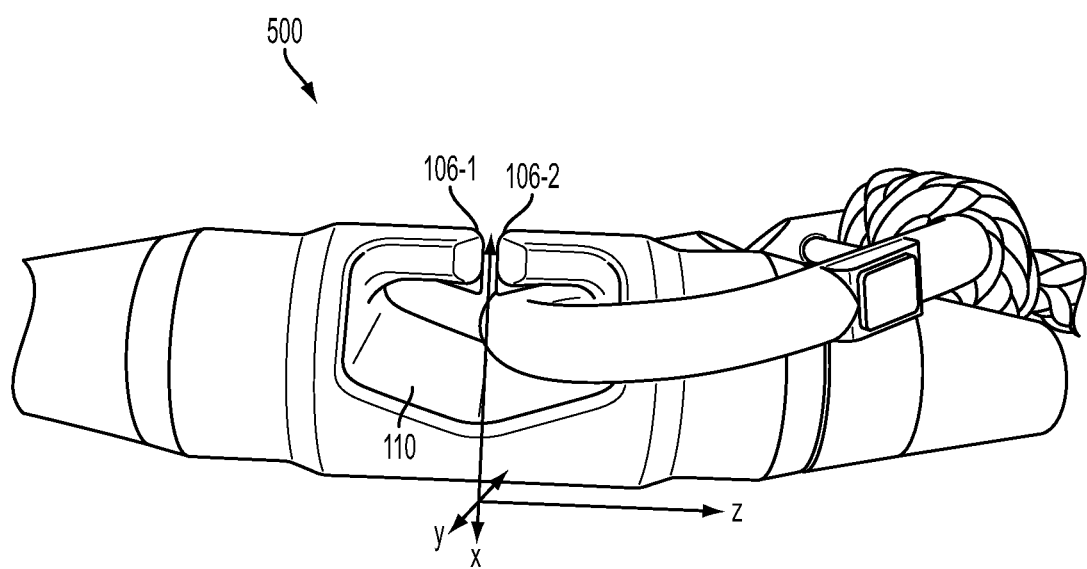
FIG. 8 is a photograph of a coupler/coupling ring assembly, according to a non-limiting exemplary embodiment of the invention.

A complimentary embodiment of the invention is a coupler/coupling ring assembly 500 as illustrated in FIGS. 7, 8. FIG. 7 shows a coupler 100-2 and a coupling ring 400-1 comprising the coupler/coupling ring assembly 500 in a disengaged assembly condition. As shown, the coupler/coupling ring assembly comprises a coupler, including a body portion having first and second ends, and an integral gate having a key entry region consisting of a space between opposing, disconnected distal ends of the gate. As shown, the gate comprises two opposing tongue sections having respective, opposing distal (free) ends separated by a distance, d, forming a key entry region, disposed between the first and second ends, further wherein the body portion has an open free space that is substantially enclosed by an inner surface of the body portion and the two opposing tongue sections; and a coupling ring that is removeably engageable with the coupler, the coupling ring including an integral perimetal body having a head section, a foot section, and two arm sections therebetween, wherein at least one of the arm sections has a key region that is complimentary to the gate, further wherein the key region consists of a solid, integral portion of the at least one arm section. The free end of at least one of the tongue sections is tapered to form a distal edge, wherein the distal edge has a length, L, along an x-axis and a width, W, along a y-axis that is perpendicular to the x-axis. The coupler has a longitudinal axis along a z-axis that is perpendicular to the x- and y-axes. The flat surface of the pinched region has a longitudinal axis that is parallel to the x-axis. The perimetal body of the coupling ring has a cross sectional dimension that is greater than d.

As noted herein above, the geometries of the respective key and key entry regions of the coupling ring and the coupler body can be reversed, such that the tongue portions of the coupler body are connected (no space) and the arm of the coupling ring is split (with appropriate end geometries) to allow engagement/disengagement of the assembly.

The coupler body has a region intermediate the gate and at least one of the first and second ends, wherein the region is characterized by a maximum radial dimension of the body portion. This region could be in the form of a single or multiple, optionally symmetrically disposed extensions of the radial dimension of the body. In an aspect, this maximum radial dimension comprises a circumferential region of the body portion illustrated as $d_{max}$ in FIG. 7. As further shown in FIG. 7, the coupling ring has a maximum separation distance A between the two arms that is substantially equal to (i.e., not considerably less than) or slighter greater than the maximum diametrical dimension $d_{max}$ (e.g., maximum diameter if cylindrical) of the body portion of the coupler. The advantageous effect of this dimensional ratio is illustrated in FIG. 8, which shows the coupler/coupling ring assembly 500 in an engaged (and as in-use) assembly condition. It can be seen that the coupling ring lays almost parallel to, and in the longitudinal (y-z) plane of, the coupler and is generally centered in the free space of the coupler about the head region of the coupling ring. In operation, either the crossbar (or nub(s)) of the coupling ring or, more likely, the looped end of the lanyard cable around the foot of the coupling ring, limits the 'flat' (or nearly flat) orientation of the coupling ring in the y-z plane. Nonetheless, the achieved degree of flatness of the assembly when there is tension on the lanyard advantageously reduces or eliminates pinching of the lanyard rope or cable, minimizes the unintentional disengagement of the coupling ring from the coupler while in-use, and provides better retrieval, winding, stowage, and deployment of a long length of cable with multiple coupler/coupling ring assemblies. In contrast, if the D-link at the other end of the lanyard as shown in FIG. 7 were coupled to the coupler in place of the embodied coupling ring, its minor dimension, being considerably less than the maximum diameter of the coupler, would cause the link to ride in the coupler at a much larger angle from the horizontal and vertical directions, and create additional instability and increased risk of disengagement of the assembly or bending and possible failure of the link.

It will be appreciated, however, that the operational interaction between the coupler body and the coupling ring in regard to the objective of obtaining an almost parallel relationship therebetween is not affected by a lighter or heavier gauge coupling ring; that is, a lighter duty coupling ring may be used with a standard duty coupler, and will advantageously be so designed and dimensioned so as to render the same benefits (e.g., minimize pinching) as a different gauge or size coupling ring.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A coupler, comprising:
an at least partially cylindrically shaped external body portion having a longitudinal axis, further comprising:
integral first and second, axially opposed ends that have a taper along the longitudinal axis; and
an integral gate consisting of two axially opposed, disconnected tongue sections having an open space there between,
further wherein the at least partially cylindrically shaped external body portion has an open space at least partially enclosed by an inner surface of the body portion and disposed over at least a portion of the at least partially cylindrically shaped external body portion,
further wherein the external body portion is characterized by a maximum radial dimension, comprising a circumferential region of the at least partially cylindrically shaped external body portion intermediate the first and second axially opposed ends wherein the gate is disposed.

2. The coupler of claim 1, wherein at least one of the axially opposed, disconnected tongue sections has a distal end that is tapered to form a distal edge.

3. The coupler of claim 2, wherein the distal edge has a length (L) along an axis and a width (W) along a different axis.

4. The coupler of claim 3, wherein the distal edge has a length (L) along an x-axis and a width (W) along a y-axis that is perpendicular to the x-axis, further wherein the coupler has a longitudinal axis along a z-axis that is perpendicular to the x- and y-axes.

5. The coupler of claim 1, wherein at least one of the axially opposed, disconnected tongue sections includes an integral lip.

6. The coupler of claim 1, wherein the axially opposed, disconnected tongue sections are separated by a distance (d), where d≥0.015 in.

7. The coupler of claim 6, wherein d is a constant value.

8. The coupler of claim 1, wherein the axially opposed, disconnected tongue sections are symmetrical.

9. The coupler of claim 1, wherein the inner surface of the body portion is angled.

10. The coupler of claim 2, wherein the distal edge has a length (L) along an axis and a width (W) along a different axis.

11. The coupler of claim 2, wherein the distal edge has a length (L) along an x-axis and a width (W) along a y-axis that is perpendicular to the x-axis, further wherein the longitudinal axis is perpendicular to the x- and y-axes.

* * * * *